United States Patent Office 3,062,119
Patented Nov. 6, 1962

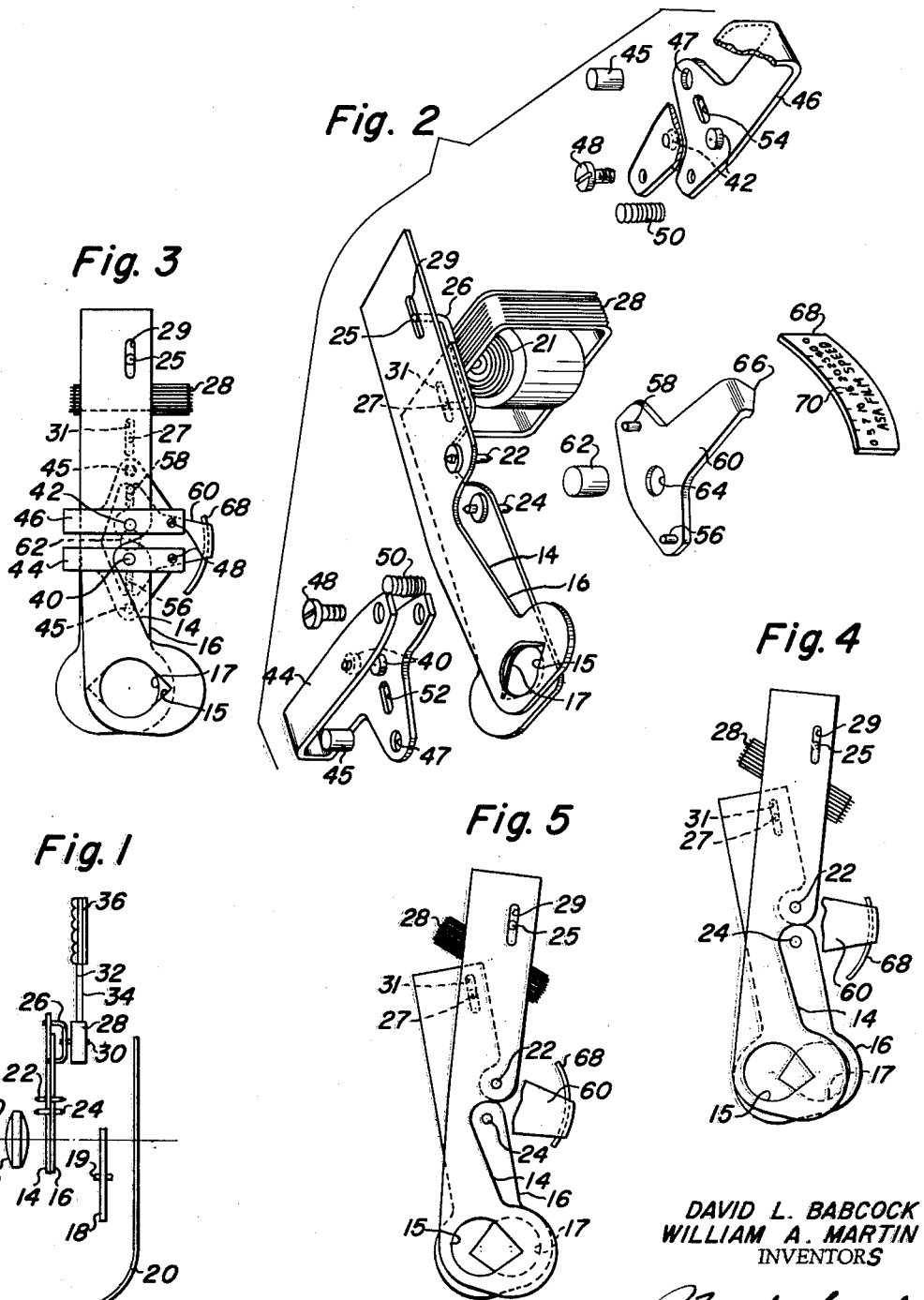

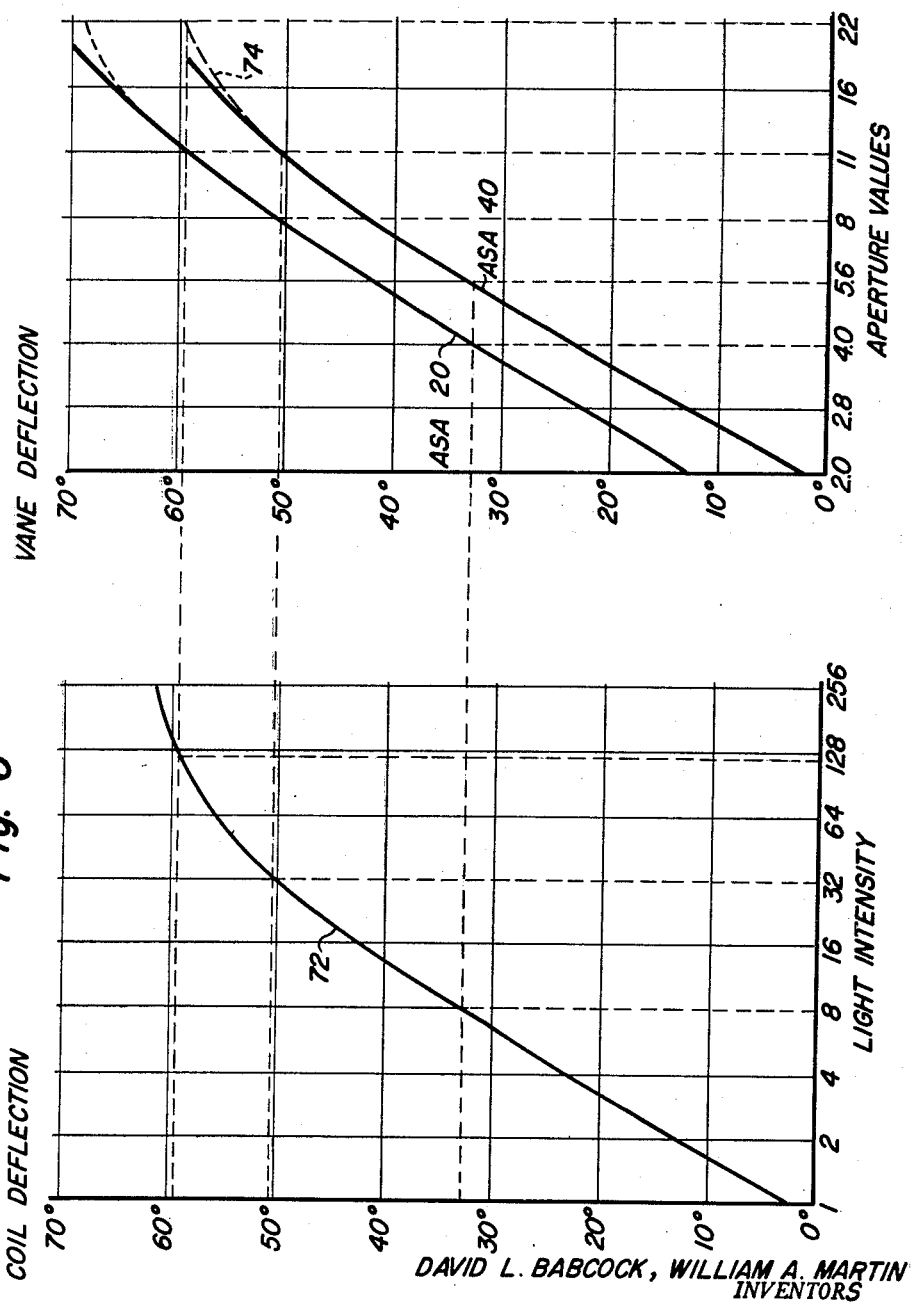

3,062,119
MECHANISM FOR ADJUSTING DIAPHRAGM-VANE PIVOTS TO COMPENSATE FOR CHANGES IN FILM SPEED
David L. Babcock and William A. Martin, Rochester, N.Y., assignors to Eastman Kodak Company, Rochester, N.Y., a corporation of New Jersey
Filed Dec. 3, 1959, Ser. No. 857,030
8 Claims. (Cl. 95—64)

The present invention relates to photographic cameras having automatic exposure control systems and more particularly concerns means to compensate for changes in film speed in such cameras.

It has been found statistically that the greatest number of photographic exposures made with high scene brightness are in situations wherein the selected subject is framed by bright back-lighting, usually sky light. In such situations, if an automatic exposure control system of a camera were to be calibrated for proper exposure of the bright background, the subject would be underexposed. Therefore it is cutomary to provide some form of compensation in the exposure control system whereby the statistically average subject is properly exposed under these circumstances.

In cameras having one or more automatically positioned diaphragm vanes with elongated, tapered apertures movable over the taking lens, the usual manner of compensating for the background lighting at high scene brightness is to flare the narrow end of each diaphragm aperture to a greater width than it would have for the theoretically ideal exposure if all of the light came from the subject. This system of compensation is fully practical only if each longitudinal section of a diaphragm aperture always corresponds to the same scene brightness, which generally is the case only if all other exposure factors, such as shutter speed and film speed, remain constant. If, however, as is frequently the case, one or more exposure factors other than the diaphragm aperture are varied in the use of a camera, then the compensation that is built into the diaphragm aperture is by itself correct for only those combinations of exposure-factor values that produce the same diaphragm opening for a given scene brightness.

In the case of motion picture cameras and many still cameras, it is the general practice to maintain shutter speed constant and to adapt the camera for a range of film speeds. The camera in which the present invention is illustrated in the accompanying drawings is of this type. In such cameras, the known manner of compensating for backlighting is obviously limited in utility because it produces a correct compensation for only one film speed.

It is therefore a primary object of the present invention to compensate for film-speed changes, in a camera having an automatically controlled diaphragm, without disturbing a diaphragm-aperture compensation for high levels of scene brightness. This object may be achieved by moving the pivots of the diaphragm vanes in order to compensate for film-speed changes.

A more specific object of the invention, in a camera having pivoted, automatically positioned diaphragm vanes wherein the vanes are provided with respective apertures which, upon movement of the vanes, form a composite exposure aperture, is to compensate for film-speed changes by moving the vane pivots in opposite directions.

A further object of the invention is to provide a diaphragm vane with two adjustable pivots, each of which is movable to compensate for a respective exposure factor.

Other objects of the invention will appear from the following description, reference being made to the accompanying drawings, wherein:

FIG. 1 is a schematic right side view of the exposure regulating elements of a motion picture camera embodying the present invention;

FIG. 2 is an exploded isometric view of the mechanism for adjusting the diaphragm-vane pivots;

FIG. 3 is a front view of the assembled mechanism shown in FIG. 2, with the diaphragm vanes in their maximum-aperture position and the vane pivots adjusted for a predetermined film speed;

FIG. 4 is a front view of the diaphragm vanes as they appear when moved away from their maximum aperture position with the same film speed adjustment as shown in FIG. 3;

FIG. 5 is a front view of the diaphragm vanes in the energized position of FIG. 4, but with a further rotational adjustment due to selection of a lower film speed; and FIG. 6 is a graph showing the relation of instrument coil deflection and diaphragm vane deflection at two settings of film speed.

Referring to FIG. 1, a typical camera embodying the present invention includes a taking-lens axis 10 on which are arranged a pair of diaphragm vanes 14 and 16, a shutter 18 pivoted at 19 and a photosensitive surface such as a filmstrip 20. Vanes 14 and 16 have respective tapered apertures 15 and 17 (see also FIG. 2) and are pivoted on posts 22 and 24, respectively, for moving apertures 15 and 17 relative to the lens axis 10, thereby to form a composite exposure aperture. Vanes 14 and 16 are driven through pin and slot couplings by a U-shaped member 26, which rotates with coil 28 about an axis 30. Member 26 has ends 25 and 27 engaging slots 29 and 31 in vanes 14 and 16, respetcively. Coil 28 constitutes the moving element of an electric measuring instrument and is energized through a pair of leads 32 and 34 by a photocell 36, which is disposed for illumination by scene light. The photocell and measuring instrument together constitute an exposure meter, which may be of any well known type.

Energization of coil 28 causes the coil to rotate about its axis 30 against the tension of a return spring 21, thereby rotating vanes 14 and 16 about their pivots to establish an exposure aperture whose area is a function of scene brightness. Apertures 15 and 17 are tapered in such degree that the composite aperture provides a single level of exposure of the film for all except the highest values of scene brightness, and provides a slightly higher exposure level for the brightest scenes in order to compensate for the statistically determined subject backlighting previously discussed.

Vane pivots 22 and 24 are mounted in respective U-shaped bearings 40 and 42, which are supported by a pair of brackets 44 and 46 (see also FIG. 3). The brackets are mounted by holes 47 for pivotal motion about fixed studs 45. The tension of bearings 40 and 42 is varied by means of respective adjusting screws 48 interconnecting the two arms of each bracket and cooperating with respective compression springs 50 through which screws 48 extend between the bracket arms.

Each bracket 44 and 46 is provided with a respective slot 52 and 54 through which a respective pin 56 or 58 extends. Pins 56 and 58 are secured to an adjusting plate 60, which is pivotally mounted on a fixed stud 62 through a hole 64. Plate 60 has a turned end forming a pointer 66, which cooperates with an arcuate scale plate 68 having scale indicia 70 graduated, for example, in values of film speed. In a preferred form of the invention, when the instrument coil 28 is in its position of zero energization, as shown in FIG. 3, vane slots 29 and 31 and their respective pins 25 and 27, as well as bracket pivots 45 and plate pivot 62, are aligned with the lens axis. In this position of the vanes the widest portions of apertures 15 and 17 are aligned with the lens axis to form an exposure aperture of maximum area.

In FIG. 3 the adjusting plate 60 is shown in a position corresponding to a high setting of film speed. In FIG. 4 the film speed setting is the same as in FIG. 3, but coil 28 is rotated to a position corresponding to greater scene brightness, so that vanes 14 and 16 are rotated to reduce the exposure aperture formed by apertures 15 and 17. In FIG. 5, coil 28 is shown in the same position as in FIG. 4, but plate 60 is rotated to a position corresponding to a lower film speed. This rotates vanes 14 and 16 about pins 25 and 27, respectively, for enlarging the exposure aperture to compensate for the decrease in film speed. It will be obvious that vanes 14 and 16 may be rotated about pivots 22 and 24 to introduce changes in one or a combination of exposure factors (for example, scene brightness) and may be rotated about pins 25 and 27, which also act as pivots, to introduce changes in another exposure factor or combination thereof (for example, film speed). It will be understood, of course, that a single, apertured vane cooperating with a fixed aperture can be adjusted in this manner within the scope of the invention.

The novel compensating structure employs a characteristic of electric measuring instruments by virtue of which the angular deflection of the instrument coil is nonlinear with respect to scene brightness at high brightness levels, but is substantially linear at all lower brightness levels. This characteristic is illustrated in FIG. 6 by the instrument response curve 72, where the axis of abscissas is marked in an arbitrary logarithmic scale of light intensities and the axis of ordinates is marked in degrees of angular deflection of the instrumetn coil, starting from a rest position. It is seen that the instrument response curve 72 is substantially linear over the lower range of light intensities from 1 to 32 and that the curve has a drooping characteristic for light intensities above 32. The linear and nonlinear ranges of the instrument are, of course, merely illustrated in FIG. 6, as emphasized by the fact that the light-intensity values are in arbitrary units.

In FIG. 6, the curve labelled "ASA 40" indicates the diaphragm apertures (axis of abscissas) corresponding to various angles of rotation of the diaphragm vane when the adjusting plate 60 (FIG. 2) is in its angular position corresponding to a film speed of ASA 40. In the absence of any backlight compensation at ASA 40, the upper portion of this curve would have a drooping characteristic, indicated at 74 by a broken line, in order to produce the ideal aperture values in cooperation with an instrument that follows curve 72. On the other hand, if the diaphragm aperture is flared to produce some compensation starting for example at a light intensity of 32 (an aperture value of f/11 and ASA 40), then the upper part of the ASA 40 curve becomes straighter, but still droops slightly, as indicated by the solid line.

When the adjusting plate is rotated, for example 10 degrees, to adjust the system for a film speed of ASA 20, an uncompensated system should set the diaphragm aperture exactly one stop larger (more light through the lens) for each value of light intensity. However, since the curve for ASA 40 droops somewhat, even if compensated, between light-intensity values of 32 and 128, and since the curve ASA 20 is raised on the axis of ordinates to correspond to rotation of the adjusting plate 60, the latter curve is substantially straight between the light-intensity values 32 and 128. Therefore, the diaphragm aperture for ASA 20 is more than one stop larger in this region than it is for ASA 40. The additional increase in aperture size, arising from system operation on a straight part of the vane-deflection curve, automatically introduces a backlight compensation when the light-intensity value is above 32. This compensation is introduced at approximately the theoretically correct position on the light intensity scale, corresponding to the arbitrarily chosen value of 32 where it was assumed such corrections should begin.

It is understood, of course, that the curves of FIG. 6 are merely typical of a large variety of curves of instrument response and diaphragm aperture. The backlight compensation may be introduced at any point within a considerable range of light-intensity values and may be introduced to any degree, also within a considerable range.

The invention has been described in detail with particular reference to preferred embodiments thereof, but it will be understood that variations and modifications can be effected within the spirit and scope of the invention as described hereinabove and as defined in the appended claims.

We claim:

1. In a camera having means for focusing an image of a photographic subject onto a photosensitive surface and having an exposure meter including a movable member, a part of said member being disposed for illumination by light from said subject whereby said movable member is positioned as a function of the intensity of said light, the combination comprising: at least one diaphragm vane having a tapered aperture disposed in cooperative relation with said focusing means for establishing an exposure aperture whose area is determined by the position of said vane, said vane aperture being tapered to provide a substantially constant image intensity at all values of illumination of said meter below a predetermined level and a greater image intensity for all values of illumination of said meter above said predetermined level; first and second pivots for said vane; means coupling said movable member to said first pivot for moving the latter in response to movement of the former, thereby to control the area of said exposure aperture as a function of the intensity of said light; and adjusting means for moving said second pivot, thereby to control the area of said exposure aperture as a function of the position of said adjusting means.

2. The combination defined in claim 1, with scale means, including a part of said adjusting means, and having indicia graduated in units representing an exposure factor, whereby a position of said adjusting means may be selected to correspond to a desired value of said exposure factor.

3. The combination defined in claim 2, wherein said scale indicia are graduated in units of photographic film speed.

4. In a camera having means for focusing an image of a scene onto a photosensitive surface and having an exposure meter adapted to be energized as a function of scene brightness, the combination comprising: at least one diaphragm vane having a tapered aperture disposed in cooperative relation with said focusing means for establishing an exposure aperture whose area is determined by the position of said vane; a pivot for said vane adapting the latter for angular movement; means coupling said meter to said vane for positioning said vane about said pivot, thereby to control the area of said exposure aperture as a function of scene brightness; supporting means for said pivot; and means for moving said supporting means to adjust the position of said vane, whereby the area of said exposure aperture is adjusted as a function of the position of said supporting means.

5. In a camera having means for focusing an image of a scene onto a photosensitive surface and having an exposure meter including a photocell adapted to be energized by scene light and a pivoted coil connected to said photocell and angularly psitioned as a function of the energization of said photocell, the combination comprising: at least one diaphragm vane having an elongated, tapered aperture disposed in cooperative relation with said focusing means to form an exposure aperture whose area is determined by the position of said vane; a pivot for said vane; a pin and slot coupling between said coil and said vane for moving the latter about said pivot in response to angular movement of said coil, whereby the area of said exposure aperture is controlled as a function of scene brightness; a bracket supporting said pivot and mounted for pivotal movement about a first axis; a manually movable adjusting plate mounted for pivotal movement about a second axis; and a pin and slot coupling between said adjusting plate and said bracket, whereby manual angular movement of said plate moves said bracket angularly to move said vane pivot for adjusting the area of said exposure aperture as a function of the position of said plate.

6. The combination defined in claim 5, with scale means including a pointer integral with said adjusting plate and a fixed scale member cooperating with said pointer and carrying indicia graduated in units corresponding to values of an exposure factor.

7. The combination defined in claim 5, wherein said first axis is substantially aligned with said pivot and with the pin and slot coupling between said coil and said vane.

8. The combination defined in claim 7, wherein said first axis also is substantially aligned with the widest portion of said vane aperture.

References Cited in the file of this patent

UNITED STATES PATENTS

| | | |
|---|---|---|
| 2,013,362 | Riszdorfer | Sept. 3, 1935 |
| 2,251,473 | Touceda | Aug. 5, 1941 |
| 2,926,571 | Sommer | Mar. 1, 1960 |